(12) United States Patent
Sundaravel et al.

(10) Patent No.: US 12,455,968 B2
(45) Date of Patent: Oct. 28, 2025

(54) MONITOR AND CONTROL TOXIC CONFIGURATION IN CONTAINER DEPLOYMENT

(71) Applicant: Bank of America Corporation, Charlotte, NC (US)

(72) Inventors: Manimaran Sundaravel, Chennai (IN); Maneesh Sethia, Telangana (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 113 days.

(21) Appl. No.: 18/401,950

(22) Filed: Jan. 2, 2024

(65) Prior Publication Data
US 2025/0217488 A1    Jul. 3, 2025

(51) Int. Cl.
*G06F 21/55* (2013.01)
*G06F 21/57* (2013.01)

(52) U.S. Cl.
CPC .......... *G06F 21/572* (2013.01); *G06F 21/554* (2013.01); *G06F 2221/034* (2013.01)

(58) Field of Classification Search
CPC .............................. G06F 21/572; G06F 21/554
See application file for complete search history.

(56) References Cited

U.S. PATENT DOCUMENTS

| | | | |
|---|---|---|---|
| 9,355,248 B1 * | 5/2016 | Wiest | G06F 9/455 |
| 9,614,929 B2 | 4/2017 | Engehausen et al. | |
| 11,133,999 B1 | 9/2021 | Brosnan et al. | |
| 2016/0182315 A1 * | 6/2016 | Salokanto | H04L 41/5054 709/226 |
| 2017/0147813 A1 * | 5/2017 | McPherson | G06F 9/45558 |
| 2018/0293374 A1 * | 10/2018 | Chen | G06F 9/45558 |
| 2018/0309747 A1 * | 10/2018 | Sweet | G06F 9/45558 |
| 2019/0156023 A1 * | 5/2019 | Gerebe | G06F 21/51 |
| 2019/0163559 A1 | 5/2019 | Takahashi et al. | |

(Continued)

FOREIGN PATENT DOCUMENTS

EP    3963447 A1    3/2022

*Primary Examiner* — Vance M Little
(74) *Attorney, Agent, or Firm* — Banner & Witcoff, Ltd.

(57) ABSTRACT

Systems and processes are disclosed to monitor and control toxic configuration in software container deployment. AI-based monitor in each node provides end-to-end fault management system that can detect, diagnose, classify, and suggest remediation actions for non-virtualized cloud-based misconfiguration vulnerabilities. Anomalies are diagnosed using pre-computed fault signatures and automated remediation is integrated with a cloud management stack. Multiple monitoring layers within nodes secure the container-based virtualization environment. Container-based "CSTC security framework" virtualization technology provides security and identifies potential toxic configuration threats. CSTC security locates container-based systems at severe risk for DDOS attacks to kernel vulnerability/container breakout and ensures appropriate privilege configuration for user processes. Resource access limited based on policies and CSTC security profiles as well as provide AI-based monitoring of container runtime behavior to provide additional security layer that ensures safety and protection in container-based virtualization.

20 Claims, 6 Drawing Sheets

(56) References Cited

U.S. PATENT DOCUMENTS

| | | |
|---|---|---|
| 2021/0141655 A1 | 5/2021 | Gamage et al. |
| 2021/0382997 A1* | 12/2021 | Yi .......................... G06F 21/577 |
| 2023/0315843 A1* | 10/2023 | Yona ..................... G06F 21/554 |
| | | 726/22 |
| 2023/0315860 A1* | 10/2023 | Yaron ................... G06F 21/577 |
| | | 726/25 |
| 2024/0427579 A1* | 12/2024 | Kussmaul ................. H04L 9/50 |

* cited by examiner

MONITOR AND CONTROL TOXIC CONFIGURATION IN CONTAINER DEPLOYMENT

TECHNICAL FIELD

The current disclosure pertains to digital processing systems and electrical computers, specifically to devices and procedures for toxic configuration monitoring and control in the deployment of software containers. These include container security toxic configuration (CSTC) virtualization technology, which locates vulnerable containers, ensures appropriate privileges, limits resource access, and monitors container runtime behavior. Additionally, for non-virtualized cloud-based misconfiguration vulnerabilities and anomalies, an AI-based monitor is used to identify, analyze, categorize, and suggest corrective actions.

DESCRIPTION OF THE RELATED ART

Figure 1A:
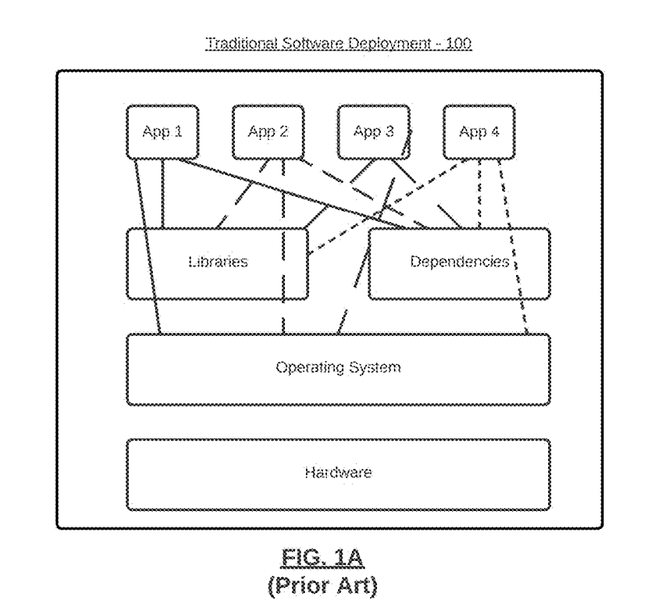
FIG. 1A depicts traditional deployment of software applications with depending their libraries and dependencies that interact directly with the operating system residing on hardware.

The conventional way of software deployment involves installing software directly onto a physical server or virtual machine. Because each server or virtual machine must be manually configured with the required software and dependencies, this process can be laborious and prone to errors. FIG. 1A shows how this can become more complicated and prone to errors.

Figure 1B:
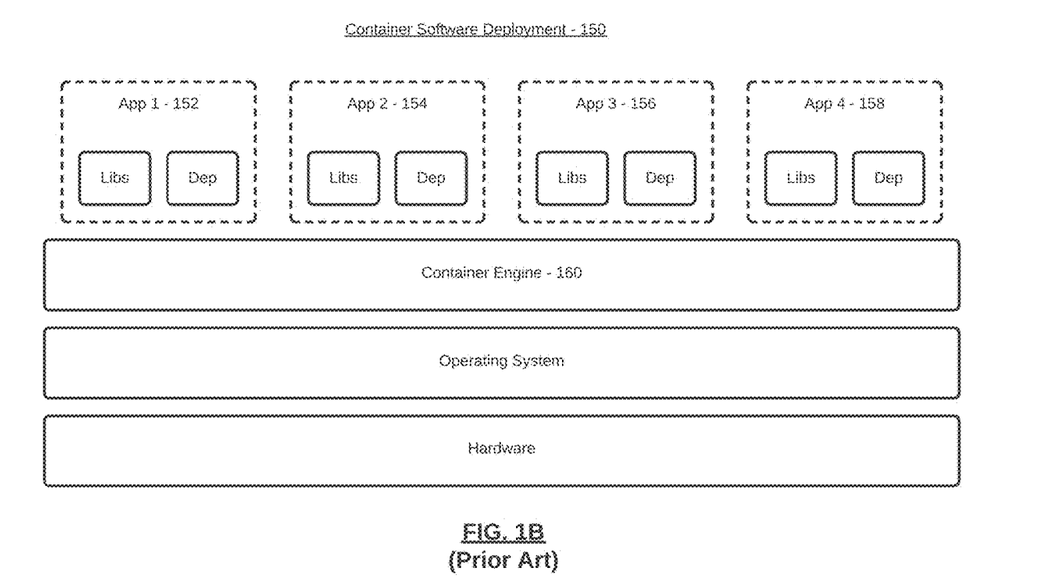
FIG. 1B depicts current deployment of software through the use of containers.

On the other hand, container software deployment comprises putting software and its dependencies into a self-contained unit called a container, as illustrated in FIG. 1B. When compared to traditional software deployment, container software deployment has a number of benefits. Containers are more consistent, scalable, lightweight, and portable. They are also simpler to administer and implement. Self-contained units called containers come with all the dependencies required for an application to function. This reduces the possibility of deployment errors because there is no need to be concerned about software version compatibility. Better application isolation: Because containers are isolated from one another, issues with one program won't impact other programs that are running on the same server. Applications' general stability and dependability may be enhanced as a result.

All things considered, managing, and deploying software applications is more dependable and efficient when done using container software deployment. Furthermore, containers have developed to enable micro-service architecture as a less expensive substitute for virtual machines. Attackers can co-locate containers in the host system more quickly than they can with virtual machines because containers communicate directly with the host kernel (as shown in FIG. 1B, where the container engine is in direct communication with the operating system).

Errors in the configuration of containerized applications, known as container misconfigurations, can lead to security flaws. Any point in the container lifecycle, from image creation to deployment and runtime, is susceptible to these misconfigurations.

Numerous common misconfigurations of containers exist. Using containers with root privileges is one example. Because containers now have access to the host system's resources, attackers may be able to escalate privileges and take over the host. Another is opening unneeded ports, which can allow hackers to get into containers and take advantage of security holes. Another is the use of vulnerable or out-of-date images, like out-of-date container images or images with known vulnerabilities that attackers could target. Mounting sensitive host files or directories can give containers access to sensitive data on the host system. Another is using insecure secrets. Secrets should be stored securely and only accessed by authorized users. Misconfigured secrets can give attackers access to sensitive data.

Organizations may suffer greatly from incorrect container configurations. An illustration would be a data breach, in which hackers could take advantage of exposed information to commit fraud or identity theft. Another is a denial-of-service or distributed-denial-of-service attack, in which hackers can use improperly configured containers to target specific applications or services in order to prevent access. Another is privilege escalation, which allows hackers to take over host systems by taking advantage of configuration errors to increase privileges.

SUMMARY OF THE INVENTION

Solutions are offered to address one or more of the aforementioned shortcomings in accordance with one or more arrangements of the non-limiting sample disclosures contained herein. These include: (a) monitoring and controlling toxic configuration in container deployment through the use of an "AI based monitor framework" and a "CSTC security framework," as well as considering operating context to identify misconfiguration vulnerabilities that result from shared non-virtualized resources; (b) diagnosing anomalies using pre-computed fault signatures to enable remediation to be integrated with a cloud stack in an automated manner; (c) employing a lightweight, automated, and precise fault detection and diagnosis AI-based monitor framework to provide an end-to-end fault detection/correction system that can detect, diagnose, classify, and suggest remediation actions for non-virtualized cloud-based misconfiguration vulnerabilities and anomalies; (d) using a detection process wherein the monitoring framework targets unknown attacks that belong to various security threats such as, for example, credential stuffing, deprecated protocols and encryption, cross-site scripting (XSS), error messages showing sensitive information and command injection with identifying with unbounded network access from containers, insecure run-time configurations, rogue containers, improper user access rights, and embedded clear texts; (e) putting in place a monitoring layer that can integrate various processes to create multiple monitoring layers inside each node and, as a result, improve the security of the virtualization environment based on containers; (f) utilizing virtualization technology with a "CSTC security framework" to address security issues by locating possible toxic configuration threats to the system; and/or (g) using CSTC security to identify container-based systems that are extremely vulnerable to DOS or DDOS attacks as a result of kernel penetration (privilege escalation) and container breakout; guaranteeing that user processes have the proper privilege configuration; restricting resource access according to established policies and CSTC security profiles; and providing process AI-based monitoring to continuously observe each container's runtime behavior, thus enabling an extra security layer that guarantees security and safety in container-based virtualization.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Nor is it intended to imply or require that any such steps or elements, in this summary or elsewhere in this disclosure, be implemented or executed in any particular order. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

A CSTC security framework may, under certain arrangements, consist of several steps such as described herein. Step 1: The container engine receives the request. Step 2: The request was sent to the suggested CSTC security layer by the container engine. Step 3: Security layer of CSTC: (a) verify the requesting container's security profile against the established access control policies; (b) verify the requesting container against the black-listed profile or security profile that is flagged as abnormal. Step 4: Following the security check, send the container engine the security decision response. Step 5: storing the fault signatures in a database where they can be described in an XML format. This enables the system to learn how to classify new types of faults with professional help, create an XML-based signature for a new fault, and compare a newly created signature with pre-existing fault signatures.

An AI-based monitor framework may comprise several steps in certain arrangements, like, for instance: Step 1: Send the first request to the monitoring engine, which keeps an eye on every physical server and virtual machine for the relevant metrics. Step 2: The event generation engine receives input from the monitoring engine and uses it to quickly identify a possible fault symptom and create an event. Step 3: The Problem Determination Engine performs additional analysis on the occurrence to identify any departures from typical behavior. In order to describe the fault signatures, which can be expressed in terms of the metrics tracked, it uses an XML format. Step 4: Use the Problem Diagnosis Engine to categorize the anomaly into one of the various fault classes based on expert knowledge and toxic configurations or anomalous scenarios found by the engine. Step 5: Remedial actions are carried out on the identified anomalies by an anomaly remediation engine. Remediation Manager receives an exclusion rule from the framework that prohibits the affected cluster/PODs from co-locating.

In some arrangements, a process for artificial intelligence (AI), automated, real-time, monitoring and control of toxic configurations in software container deployment can comprise one or more steps including: detecting, by information security computing (ISC) machine, a build request; loading, by a build routine in response to the build request, application code and code dependencies from a repository; generating, by the build routine, a container image for the application code and code dependencies. Additional steps may include scanning, by the ISC machine, the container image in the SIT/UAT environment for said toxic configurations by: loading, by a container security toxic configuration (CSTC) apparatus in the ISC machine, access control policies and black-listed information into a CSTC security layer; verifying, by the CSTC security layer, the container image against the access control policies; verifying, by the CSTC security layer, the container image against the black-listed information; generating, by the CSTC security layer, a container-image security decision for the container image; generating, by the CSTC security layer, a first fault signature if the container-image security decision is negative; comparing, by the CSTC security layer, the first fault signature with prior fault signatures; updating, by the CSTC security layer, the access control policies or the backlisted information based on the fault signature; deploying, by the ISC machine into a system integration testing/user acceptance testing (SIT/UAT) environment on a SIT/UAT machine if the container-image security decision is positive, the container image as a SIT/UAT container; executing, by a SIT/UAT container engine on the SIT/UAT machine, the SIT/UAT container. Further steps may include monitoring, by an AI monitor in the ISC machine, the SIT/UAT container being executed on the SIT/UAT machine by: monitoring, by a monitoring engine, SIT/UAT metrics of the SIT/UAT environment; detecting, by the monitoring engine, a SIT/UAT anomaly in the metrics based on the SIT/UAT container being executed; generating, by an event generation engine, a SIT/UAT system event if the SIT/UAT anomaly was detected; identifying, by the event generation engine, a SIT/UAT possible fault for the SIT/UAT system event; analyzing, by a problem determination engine, the SIT/UAT anomaly to identify SIT/UAT departures from typical behavior based on the SIT/UAT possible fault; classifying, by the problem diagnosis engine, the SIT/UAT anomaly into a fault class based on historical data; determining, by the problem diagnosis engine, whether the SIT/UAT anomaly matches a historical problem; executing, by an anomaly remediation engine, first remedial actions to correct the SIT/UAT anomaly if a solution is known for the historical problem; executing, by the anomaly remediation engine, an SIT/UAT exclusion measure if the SIT/UAT anomaly does not match said historical problem or if the solution is not known; and generating, by the ISC machine, a SIT/UAT security decision that is positive if the solution was known for the historical problem or if the SIT/UAT system event was not generated.

In some arrangements, one or more additional or alternative steps may be performed such as, for example, deploying, by the ISC machine into a production environment on a production machine, the SIT/UAT container image as a production container. After deployment, production steps may include: executing, by a production container engine on the production machine, the production container; monitoring, by the AI monitor in the ISC machine, the production container being executed on the production machine by: monitoring, by the monitoring engine, production metrics of the production environment; detecting, by the monitoring engine, a production anomaly in the production metrics based on the production container being executed; generating, by the event generation engine, a production system event if the production anomaly was detected; identifying, by the event generation engine, a production possible fault for the production system event; analyzing, by the problem determination engine, the production anomaly to identify production departures from said typical behavior based on the production possible fault; classifying, by the problem diagnosis engine, the production anomaly into the fault class based on the historical data; determining, by the problem diagnosis engine, whether the production anomaly matches said historical problem; executing, by an anomaly remediation engine, remedial actions to correct the production anomaly if the solution is known for the historical problem; and executing, by the anomaly remediation engine, a production exclusion measure if the production anomaly does not match said historical problem or if the solution is not known.

In some arrangements, one or more additional or alternative steps may be performed such as, for example, scanning, by the ISC machine, the production container in the production environment for said toxic configurations; verifying, by the CSTC security layer, the production container against the access control policies; verifying, by the CSTC security layer, the production container against the black-listed information; generating, by the CSTC security layer, a production container security decision for the production container; generating, by the CSTC security layer, a second fault signature if the production container security decision is negative; comparing, by the CSTC security layer, the second fault signature with prior fault signatures; and updating, by the CSTC security layer, the access control policies or the backlisted information based on the second fault signature.

In some arrangements, the process may include the steps of: executing, by the anomaly remediation engine, second remedial actions to correct the production container if the production container security decision was negative and a resolution is known; executing, by the anomaly remediation engine, a production exclusion measure for the production container if the production container security decision was positive or if the resolution was not known; detecting, by the AI monitor, microservice status health for the production environment during execution of the production container; and monitoring, by the AI monitor, the production environment for measurement alarms corresponding to the production metrics.

In some arrangements, production metrics may include utilization data for processing units, memory, cache, network, and disk resources as well as application data of latency and throughput for worker nodes in the production environment.

In some arrangements, production system events are generated by looking at each monitored metric for each cluster in isolation.

In some arrangements, the problem determination engine utilizes statistical correlation across the worker nodes and metrics to identify toxic configurations.

In some arrangements, the problem diagnosis engine performs categorization based on supervised or semi-supervised machine learning.

In some arrangements, one or more of the SIT/UAT metrics, the production metrics, the SIT/UAT system event, the production system event, the first fault signature, the second fault signature, the access control policies, and the backlisted information are stored in XML format to provide benefits such as, for example, human readability and understandability, self-describing metadata, extensibility, data integrity, and data validation.

In some arrangements, the anomaly remediation engine is integrated within a cloud management stack in order to perform remediation in an automated manner.

In some arrangements, the anomaly remediation engine arbitrates faults from a faulted cloud module to a non-faulted cloud module.

In some arrangements, the SIT/UAT exclusion measure and the production exclusion measure prevent container co-location for information security protection.

In some arrangements, machines in the SIT/UAT or production environment may be physical machines such as nodes, servers, or the like, or may be virtual machines.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

FIG. 1A depicts traditional deployment of software applications with depending their libraries and dependencies that interact directly with the operating system residing on hardware.

Installing software straight onto a computer, server, or virtual machine is what is meant by the term "traditional software deployment" 100. As a result of the necessity of manually configuring each server or virtual machine with the appropriate software and dependencies, this procedure can be both time-consuming and prone to error. This has the potential to become difficult and prone to errors, as seen in FIG. 1A. Each application (App 1, App 2, App 3, App 4, etc.) has its own library requirements and required dependencies as well as direct ties into the operating system.

FIG. 1B depicts current deployment of software through the use of containers. Container software deployment 150 entails the packaging of software and its dependencies into portable, self-contained units known as containers, as shown in elements 152, 154, 156, and 158 of FIG. 1B. A container is a standard unit of software that packages up code and with its dependencies, so the application runs quickly and reliably from one computing environment to another. A container image is a lightweight, standalone, executable package of software that includes everything needed to run an application: code, runtime, system tools, system libraries and settings. Container images become containers at runtime on a container engine 160. Containers isolate software from its environment and ensure that it works uniformly despite differences for instance between development and staging.

Figure 2:
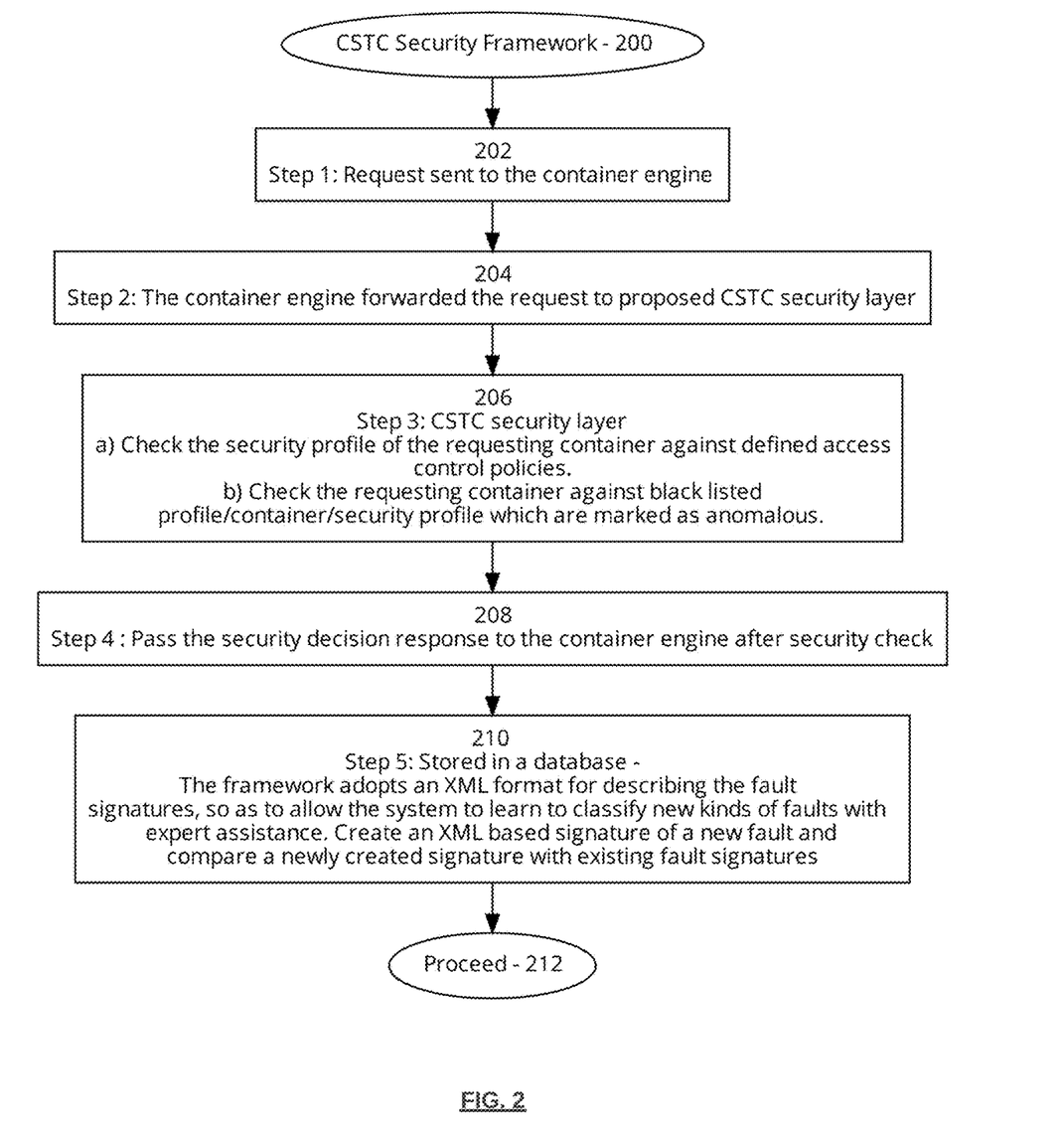
FIG. 2 depicts flow functionality conceptually showing sample interactions, steps, functions, and components in accordance with one or more CSTC security framework aspects of this disclosure.

FIG. 2 depicts flow functionality conceptually showing sample interactions, steps, functions, and components in accordance with one or more CSTC security framework aspects of this disclosure.

As shown in 202 of the CSTC security Framework process, a request is first sent to the container engine in step one. In step 2, the container engine forwards the request to the proposed CSTC security layer in 204.

In the CSTC security layer 206, a check of the security profile of the requesting container against defined access control policies is performed in step 3A. Next a check of the requesting container against black-listed profiles/containers/security profiles is executed in order to identify that are marked as anomalous.

In step 4, the security decision response is passed to the container engine after the security check in 404.

In 212, storage in a database or other data store can take place in step 5. The CSTC framework adopts an XML format for describing the fault signatures, so as to allow the system to learn to classify new kinds of faults with expert assistance. This can be in the form of supervised or semi-supervised machine learning (ML) if desired. An XML based signature of a new fault can be created. Newly created signatures can be compared with existing fault signatures.

Figure 3:
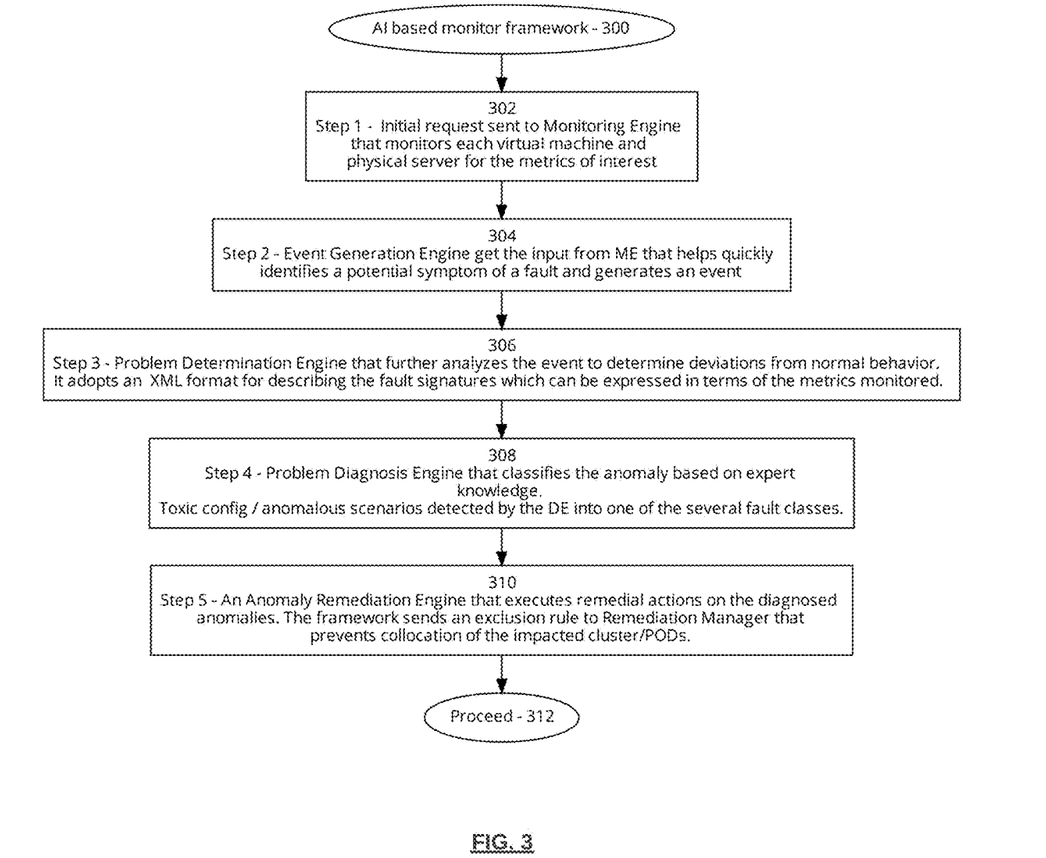
FIG. 3 depicts flow functionality conceptually showing sample interactions, steps, functions, and components in accordance with one or more AI-based monitor framework aspects of this disclosure.

FIG. 3 depicts flow functionality conceptually showing sample interactions, steps, functions, and components in accordance with one or more AI-based monitor framework aspects of this disclosure.

In the AI based monitor framework 300, step one is that an initial request is transmitted to the monitoring engine that monitors each virtual machine and physical server for the metrics of interest in 302.

In 304, the second step is that the event generation engine receives the input from monitoring engine that helps quickly identifies a potential symptom of a fault and generates an event.

In 306, the next step is that a problem determination engine further analyzes the event to determine deviations from normal behavior. It adopts an XML format for describing the fault signatures which can be expressed in terms of the metrics monitored.

In 308, step four is that a problem diagnosis engine classifies the anomaly based on expert knowledge. Toxic configurations and/or anomalous scenarios detected by the problem diagnosis engine are classified into one of the several fault classes.

In 310, an Anomaly Remediation Engine executes remedial actions on the diagnosed anomalies in step five. The framework sends an exclusion rule to a remediation manager that prevents collocation of the impacted cluster/PODs.

Figure 4:
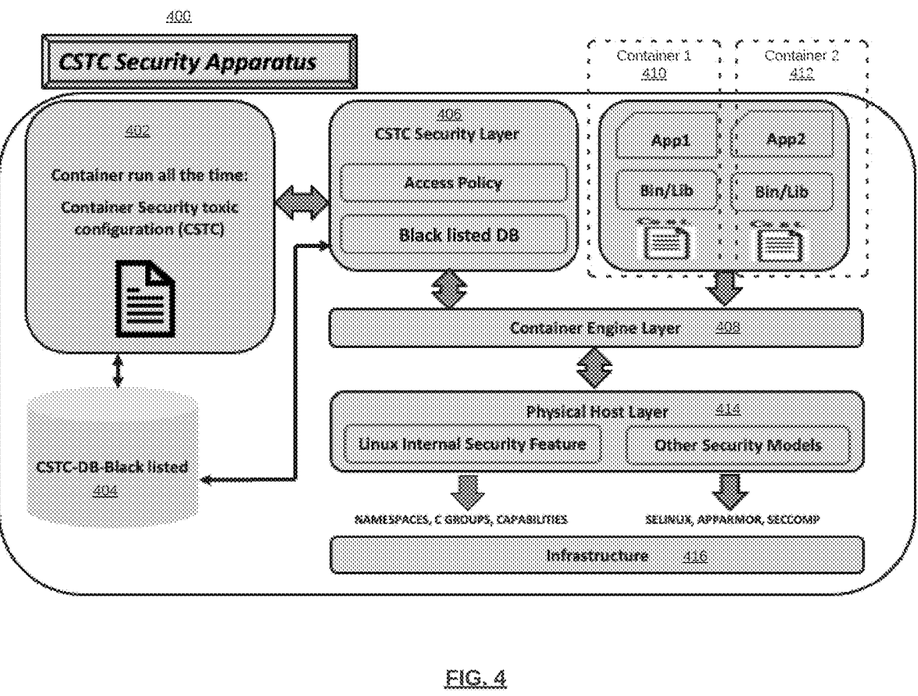
FIG. 4 depicts a sample, functional, technical/representative architectural diagram with flow functionality conceptually showing sample interactions, steps, functions, and components in accordance with one or more aspects of the CSTC security apparatus of this disclosure.

FIG. 4 depicts a sample, functional, technical/representative architectural diagram with flow functionality conceptually showing sample interactions, steps, functions, and components in accordance with one or more aspects of the CSTC security apparatus 400 of this disclosure.

As shown in 402, containers run or can execute all the time. A container security toxic configuration (CSTC) is utilized. A database or the like for black-listed configurations is stored in CSTC-DB-Black listed 404.

A CSTC security layer 406 has an access policy component and a black-listed component. Access policies may be obtained from CSTC 402 and the black-listed items may be obtained from CSTC-DB-Black listed 404.

The CSTC security layer 406 is operatively coupled to a container engine layer 408. Containers 1, 2 . . . N (e.g., 410 and 412) contain the software application its particular dependencies and libraries (including the precise version thereof required by the application). The containers 410 and 412 are executed by the container engine as part of container engine layer 408.

The container engine layer 408 resides on top of physical host layer 414. This can include Linux or other internal security features as well as other security models. The physical host layer 414 interfaces with system and network infrastructure 416.

Figure 5:
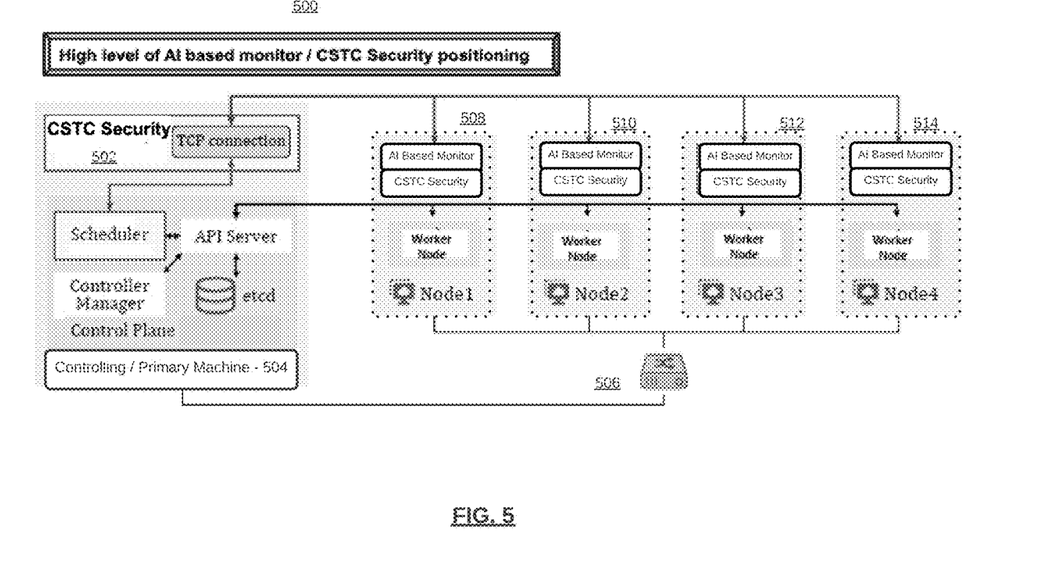
FIG. 5 depicts a sample, functional, technical/representative architectural diagram with flow functionality conceptually showing sample interactions, steps, functions, and components in accordance with one or more aspects of the AI-based monitoring/CSTC security positioning aspects of this disclosure.

FIG. 5 depicts a sample, functional, technical/representative architectural diagram with flow functionality conceptually showing sample interactions, steps, functions, and components in accordance with one or more aspects of the AI-based monitoring/CSTC security positioning 500 aspects of this disclosure.

CSTC security 502 contains a TCP/IP connection interface to AI-based monitoring/CSTC security components in worker nodes such as Node1, Node2, Node3, Node4, . . . NodeN (e.g., 508-514).

An API server is part of the controlling/primary machine 504. The API server is a software application that exposes an application programming interface (API) to clients of the nodes. An API is a set of rules and specifications that define how two pieces of software can communicate with each other. The API server of 504 acts as an intermediary between the client and the application's data or services of nodes 508-514.

In machine 504, the API server is operatively coupled to database storage, a controller manager, and scheduler, which is also coupled to CSTC security 502 through a TCP connection or the like. The controlling/primary machine 504 can also be coupled to drives or controlled machines 506.

Figure 6:
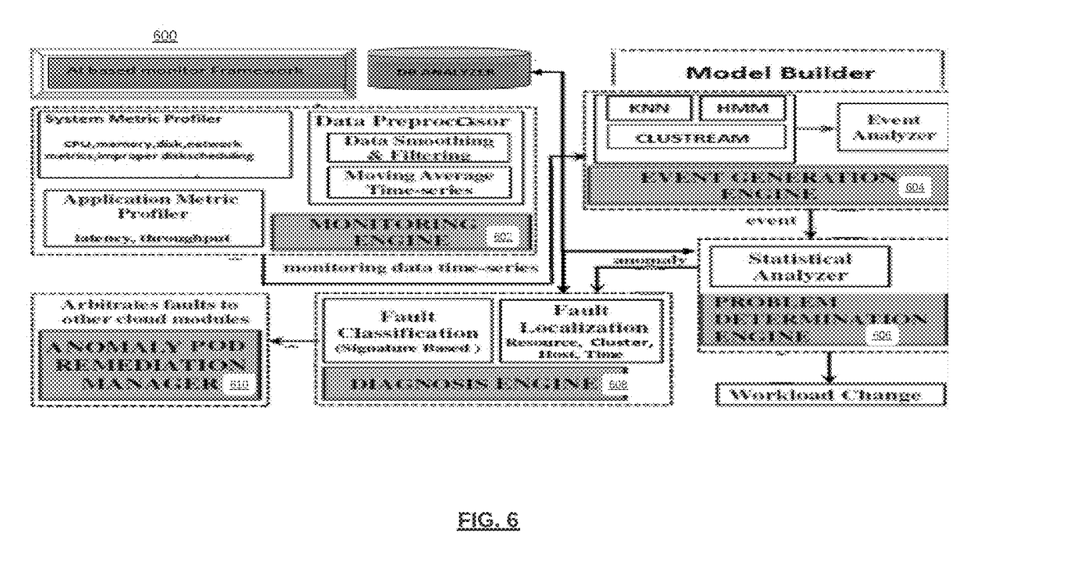
FIG. 6 depicts a sample, functional, technical/representative architectural diagram with flow functionality conceptually showing sample interactions, steps, functions, and components in accordance with one or more aspects of the AI-based monitor apparatus of this disclosure.

FIG. 6 depicts a sample, functional, technical/representative architectural diagram with flow functionality conceptually showing sample interactions, steps, functions, and components in accordance with one or more aspects of the AI based monitor apparatus of this disclosure.

Monitoring Engine 602 collects and processes various system metrics pertaining to CPU, memory, cache, network, and disk resources, and also application metrics such as latency and throughput for every worker node.

Event Generation Engine 604 is light weight. Events are generated by looking at each monitored metric for each cluster in isolation. It identifies the potential symptoms of anomalous behavior without the need for excessive of computation. If desired, it can be parallelized with a separate thread performing the analysis for each (metric) pair.

Problem Determination Engine 606 utilizes statistical correlation across worker node and resource metrics to identify misconfigured and anomalies.

Problem Diagnosis Engine 608 uses predefined expert knowledge to categorize the potentially anomalous scenarios detected by the Problem Determination Engine into one of the several fault classes. The expert knowledge is made available to the system in the form of standardized fault signatures.

Anomaly Remediation Manager 610 receives input from the Problem Diagnosis Engine to perform suitable remedial actions. For all other cases, a notification can be sent to an application or a system administrator.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A process for artificial intelligence (AI), automated, real-time, monitoring and control of toxic configurations in software container deployment comprising the steps of:
    detecting, by an information security computing (ISC) machine, a build request;
    loading, by a build routine in response to the build request, application code and code dependencies from a repository;
    generating, by the build routine, a container image for the application code and code dependencies;
    scanning, by the ISC machine, the container image in a system integration testing/user acceptance testing (SIT/UAT) environment for said toxic configurations by:
        loading, by a container security toxic configuration (CSTC) apparatus in the ISC machine, access control policies and black-listed information into a CSTC security layer;
        verifying, by the CSTC security layer, the container image against the access control policies;
        verifying, by the CSTC security layer, the container image against the black-listed information;
        generating, by the CSTC security layer, a container-image security decision for the container image;
        generating, by the CSTC security layer, a first fault signature if the container-image security decision is negative;
        comparing, by the CSTC security layer, the first fault signature with prior fault signatures;
        updating, by the CSTC security layer, the access control policies or the backlisted information based on the first fault signature;
    deploying, by the ISC machine into the SIT/UAT environment on a SIT/UAT machine if the container-image security decision is positive, the container image as a SIT/UAT container;
    executing, by a SIT/UAT container engine on the SIT/UAT machine, the SIT/UAT container;
    monitoring, by an AI monitor in the ISC machine, the SIT/UAT container being executed on the SIT/UAT machine by:
        monitoring, by a monitoring engine, SIT/UAT metrics of the SIT/UAT environment;
        detecting, by the monitoring engine, a SIT/UAT anomaly in the metrics based on the SIT/UAT container being executed;
        generating, by an event generation engine, a SIT/UAT system event if the SIT/UAT anomaly was detected;
        identifying, by the event generation engine, a SIT/UAT possible fault for the SIT/UAT system event;
        analyzing, by a problem determination engine, the SIT/UAT anomaly to identify SIT/UAT departures from expected behavior based on the SIT/UAT possible fault;
        classifying, by a problem diagnosis engine, the SIT/UAT anomaly into a fault class based on historical data;
        determining, by the problem diagnosis engine, whether the SIT/UAT anomaly matches a historical problem;
        executing, by an anomaly remediation engine, first remedial actions to correct the SIT/UAT anomaly if a solution is known for the historical problem;

executing, by the anomaly remediation engine, an SIT/UAT exclusion measure if the SIT/UAT anomaly does not match said historical problem or if the solution is not known; and generating, by the ISC machine, a SIT/UAT security decision that is positive if the solution was known for the historical problem or if the SIT/UAT system event was not generated.

2. The process of claim 1 further comprising the step of: deploying, by the ISC machine into a production environment on a production machine, the SIT/UAT container image as a production container.

3. The process of claim 2 comprising the steps of:
executing, by a production container engine on the production machine, the production container;
monitoring, by the AI monitor in the ISC machine, the production container being executed on the production machine by:
monitoring, by the monitoring engine, production metrics of the production environment;
detecting, by the monitoring engine, a production anomaly in the production metrics based on the production container being executed;
generating, by the event generation engine, a production system event if the production anomaly was detected;
identifying, by the event generation engine, a production possible fault for the production system event;
analyzing, by the problem determination engine, the production anomlay to identify production departures from said expected behavior based on the production possible fault;
classifying, by the problem diagnosis engine, the production anomaly into the fault class based on the historical data;
determining, by the problem diagnosis engine, whether thr production anomaly matches said historical problem;
executing, by the anomaly remediation engine, remedial actions to correct the production anomaly if the solution is known for the historical problem, and
executing, by the anomaly remediation engine, a production exclusion measure if the production anomlay does notmatch said historical problem or if the solution is not known.

4. The process of claim 3 comprising the steps of:
scanning, by the ISC machine, the production container in the production environment for said toxic configurations;
verifying, by the CSTC security layer, the production container against the access control policies;
verifying, by the CSTC security layer, the production container against the black-listed information;
generating, by the CSTC security layer, a production container security decision for the production container;
generating, by the CSTC security layer, a second fault signature if the production container security decision is negative;
comparing, by the CSTS security layer, the second fault signature with prior fault signatures; and
updating, byt he CSTS security layer, the access control policies or the backlisted information based on the second fault signature.

5. The process of claim 4 further comprising the step of:
executing, by the anomaly remediation engine, second remedial actions to correct the production container if the production container security decision was negative and a resolution in known.

6. The process of claim 5 further comprising the step of: executing, by the anomaly remediation engine, a production exclusion measure for the production container if the production container security was positive or if the resolution was not known.

7. The process of claim 6 further comprising the step of: detecting, by the AI monitor, microservice status health for the production environment during execution of the production container.

8. The process of claim 7 further comprgin the step of: monitoring, by the AI monitor, the production environment for meaurement alarms corresponding to the production metrics.

9. The process of claim 8 wherein the production metrics include utilization data for progressing units, cache, network, and disk resources as well as application data of latency and throughput for worker nodes in the production environment.

10. The process of claim 9 wherein the production system event is generated by looking at each monitored metric for each cluster in isolation.

11. The process of claim 10 wherein the problem determination engine utilizes statistical correlation across the worker nodes and said production metrics to identify said toxic configurations.

12. The process of claim 11 wherein the problem diagnosis engine performs categorization based on supervised or semi-supervised machine learning.

13. The process of claim 12 wherein the SIT/UAT metrics, the production metrics, the SIT/UAT system event, the production system event, the first fault signature, the second fault signature, the access control policies, and the backlisted information are in XML format.

14. The process of claim 13 wherein the anomaly remediation engine is integrated within a cloud management stack in order to perform remediation in an automated manner.

15. The process of claim 14 wherein the SIT/UAT machine and the production machine are physical servers.

16. The process of claim 14 wherein the anomaly remediation engine arbitrates faults from a faulted cloud module to a non-faulted cloud module.

17. The process of claim 16 wherein the SIT/UAT exclusion measure and the production exclusion measure prevent container co-location for information security protection.

18. The process of claim 16 wherein the SIT/UAT machine and the production machine are vistual machines.

19. A process for artificial intelligence (AI), automated, real-time, monitoring and control of toxic configurations in software container deployment comprising the steps of:
detecting, by an information security computing (ISC) machine, a build request;
loading, by a build routine in response to the build request, application code and code dependencies from a repository;
generating, by the build routine, a container image for the application code and code dependencies;
scanning, by the ISC machine, the container image in a system integration testing/user acceptance testing (SIT/UAT) environment for said toxic configurations by:
loading, by a container security toxic configuration (CSTC) apparatus in the ISC machine, access control policies and black-listed information into a CSTC security layer;

verifying, by the CSTC security layer, the container image against the access control policies;
verifying, by the CSTC security layer, the container image against the black-listed information;
generating, by the CSTC security layer, a container-image security decision for the container image;
generating, by the CSTC security layer, a first fault signature if the container-image security decision is negative;
comparing, by the CSTC security layer, the first fault signature with prior fault signatures;
updating, by the CSTC security layer, the access control policies or the backlisted information based on the first fault signature;
deploying, by the ISC machine into the SIT/UAT environment on a SIT/UAT machine if the container-image security decision is positive, the container image as a SIT/UAT container;
executing, by a SIT/UAT container engine on the SIT/UAT machine, the SIT/UAT container;
monitoring, by an AI monitor in the ISC machine, the SIT/UAT container being executed on the SIT/UAT machine by:
 monitoring, by a monitoring engine, SIT/UAT metrics of the SIT/UAT environment, said monitoring engine including a system metric profiler, an application metric profiler, a data smoothing and filtering component, and moving-average time-series data;
 detecting, by the monitoring engine, a SIT/UAT anomaly in the metrics based on the SIT/UAT container being executed based on cluster isolation review;
 generating, by an event generation engine, a SIT/UAT system event if the SIT/UAT anomaly was detected;
 identifying, by the event generation engine, a SIT/UAT possible fault for the SIT/UAT system event;
 analyzing, by a problem determination engine based on statistical correlation across SIT/UAT worker nodes and SIT/UAT metrics, the SIT/UAT anomaly to identify SIT/UAT departures from expected behavior based on the SIT/UAT possible fault;
 classifying, by a problem diagnosis engine, the SIT/UAT anomaly into a fault class based on historical data;
 determining, by the problem diagnosis engine, whether the SIT/UAT anomaly matches a historical problem;
 executing, by an anomaly remediation engine, first remedial actions to correct the SIT/UAT anomaly if a solution is known for the historical problem;
 executing, by the anomaly remediation engine, an SIT/UAT exclusion measure if the SIT/UAT anomaly does not match said historical problem or if the solution is not known;
generating, by the ISC machine, a SIT/UAT security decision that is positive if the solution was known for the historical problem or if the SIT/UAT system event was not generated;
deploying, by the ISC machine into a production environment on a production machine, the SIT/UAT container image as a production container;
executing, by a production container engine on the production machine, the production container;
monitoring, by the AI monitor in the ISC machine, the production container being executed on the production machine by:
 monitoring, by the monitoring engine, production metrics of the production environment;
 monitoring, by the AI monitor, the production environment for measurement alarms corresponding to the production metrics;
 detecting, by the monitoring engine, a production anomaly in the production metrics based on the production container being executed;
 detecting, by the AI monitor, microservice status health for the production environment during execution of the production container;
 generating, by the event generation engine, a production system event if the production anomaly was detected;
 identifying, by the event generation engine, a production possible fault for the production system event;
 analyzing, by the problem determination engine, the production anomaly to identify production departures from said expected behavior based on the production possible fault;
 classifying, by the problem diagnosis engine, the production anomaly into the fault class based on the historical data;
 determining, by the problem diagnosis engine, whether the production anomaly matches said historical problem;
 executing, by an anomaly remediation engine, remedial actions to correct the production anomaly if the solution is known for the historical problem;
 executing, by the anomaly remediation engine, a production exclusion measure if the production anomaly does not match said historical problem or if the solution is not known;
scanning, by the ISC machine, the production container in the production environment for said toxic configurations by:
 verifying, by the CSTC security layer, the production container against the access control policies;
 verifying, by the CSTC security layer, the production container against the black-listed information;
 generating, by the CSTC security layer, a production container security decision for the production container;
 generating, by the CSTC security layer, a second fault signature if the production container security decision is negative;
 comparing, by the CSTC security layer, the second fault signature with prior fault signatures;
 updating, by the CSTC security layer, the access control policies or the backlisted information based on the second fault signature;
 executing, by the anomaly remediation engine, second remedial actions to correct the production container if the production container security decision was negative and a resolution is known; and
 executing, by the anomaly remediation engine, a production exclusion measure for the production container if the production container security decision was positive or if the resolution was not known.

20. The process of claim 19 wherein the anomaly remediation engine automatically arbitrates faults from a faulted cloud module to a non-faulted cloud module and he SIT/UAT exclusion measure and the production exclusion measure prevent container co-location for information security protection.

* * * * *